United States Patent [19]

Saito

[11] Patent Number: 5,081,599
[45] Date of Patent: Jan. 14, 1992

[54] DIAGNOSTIC SYSTEM

[75] Inventor: Takashi Saito, Ueda, Japan

[73] Assignee: Kabushiki Kaisha Nagano Technical Service, Nagano, Japan

[21] Appl. No.: 562,920

[22] Filed: Aug. 6, 1990

[30] Foreign Application Priority Data

Aug. 11, 1989 [JP] Japan .................................. 1-208490

[51] Int. Cl.$^5$ .............................................. G06F 15/46
[52] U.S. Cl. ................... 364/551.01; 364/486; 364/554; 340/703
[58] Field of Search ............... 364/474.19, 486, 569, 364/551.01, 559-563, 554; 340/701, 703, 747

[56] References Cited

U.S. PATENT DOCUMENTS

| | | | |
|---|---|---|---|
| 4,504,920 | 3/1985 | Mickowski | 364/550 |
| 4,562,549 | 12/1985 | Tanaka et al. | 364/486 |
| 4,563,746 | 1/1986 | Yoshida et al. | 364/492 |
| 4,583,280 | 4/1986 | Corrigan et al. | 364/479.19 |
| 4,646,247 | 2/1987 | Otsuki | 364/474.19 |
| 4,675,147 | 6/1987 | Schafer et al. | 376/245 |
| 4,864,160 | 9/1989 | Abdoo | 364/569 |
| 5,018,069 | 5/1991 | Pettigrew | 364/424.04 |

Primary Examiner—Thomas G. Black

[57] ABSTRACT

In a diagnostic system, output patterns stored in first and second memories are compared by a comparing device so as to get remainders of items known by comparing the output patterns. The remainders of the items are shown as a graph of an interrelationship between the items by an output device. An operator can know mutual affect of the items and tendency of a machine by watching the graph. Therefore, trouble relating to the items, which interact mutually, can be prevented, and a suitable counteraction can be quickly taken even after trouble occurs, so that the maintenance efficiency can be greatly increased.

10 Claims, 4 Drawing Sheets

X : A1—A0 or E1—E0
Y : B1—B0 or F1—F0

DIAGNOSTIC SYSTEM

BACKGROUND OF THE INVENTION

The present invention relates to a diagnostic system, and more specifically relates to a diagnostic system, which can visually show operational condition of machines so as to provide data for detecting abnormal signs of the machines.

Conventionally, a programmable controller with a computer system has been known as a diagnostic system. In the programmable controller, the built-in microprocessor detects abnormal physical value, which is detected when the machine falls into an abnormal condition, and the microprocessor shows parts of the machine having trouble and the type of trouble.

However, the above noted programmable controller has the following disadvantages. The programmable controller provides no signs to an operator until the machine falls into an abnormal condition or breaks down, so that a manufacturer or a user begins to repair the machine after the trouble occurs. Therefore, the manufacturer must secure maintenance workers, and the user incurs economic damage because machine operation stops.

SUMMARY OF THE INVENTION

An object of the present invention is to provide a diagnostic system which shows effective data for preventive maintenance of machines so as to secure stable operation thereof.

To achieve the object, the structure of the present invention is a diagnostic system comprising;

a first memory storing an output pattern of an ideal output pulse with respect to a reference pulse;

a second memory storing an output pattern of a real output pulse with respect to a reference pulse;

compare means for comparing the output patterns stored in the first memory and the second memory so as to get a remainder for each item which is known by the comparison between the two output patterns; and control means for showing the remainder of the items as a graph of an interrelationship between the items by output means.

In the diagnostic system of the present invention, the remainder between ideal data and real data, which is calculated by the compare means, of items is shown as the graph of interrelationship thereof by the output means, so that an operator can know mutual affect of the items and tendency of the operation of the machine at once. Therefore, preventive maintenance for trouble which relates to the interrelationship among the items and quick response to occurrence of trouble can be executed, and the maintenance efficiency can be greatly increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be apparent from the following description, reference being had to the accompanying drawings which are given by way of illustration only, and thus are not limitative of the present invention, and wherein preferred embodiments of the present invention are clearly shown.

DETAILED DESCRIPTION OF PREFERRED EMBODIMENT

Figure 1:
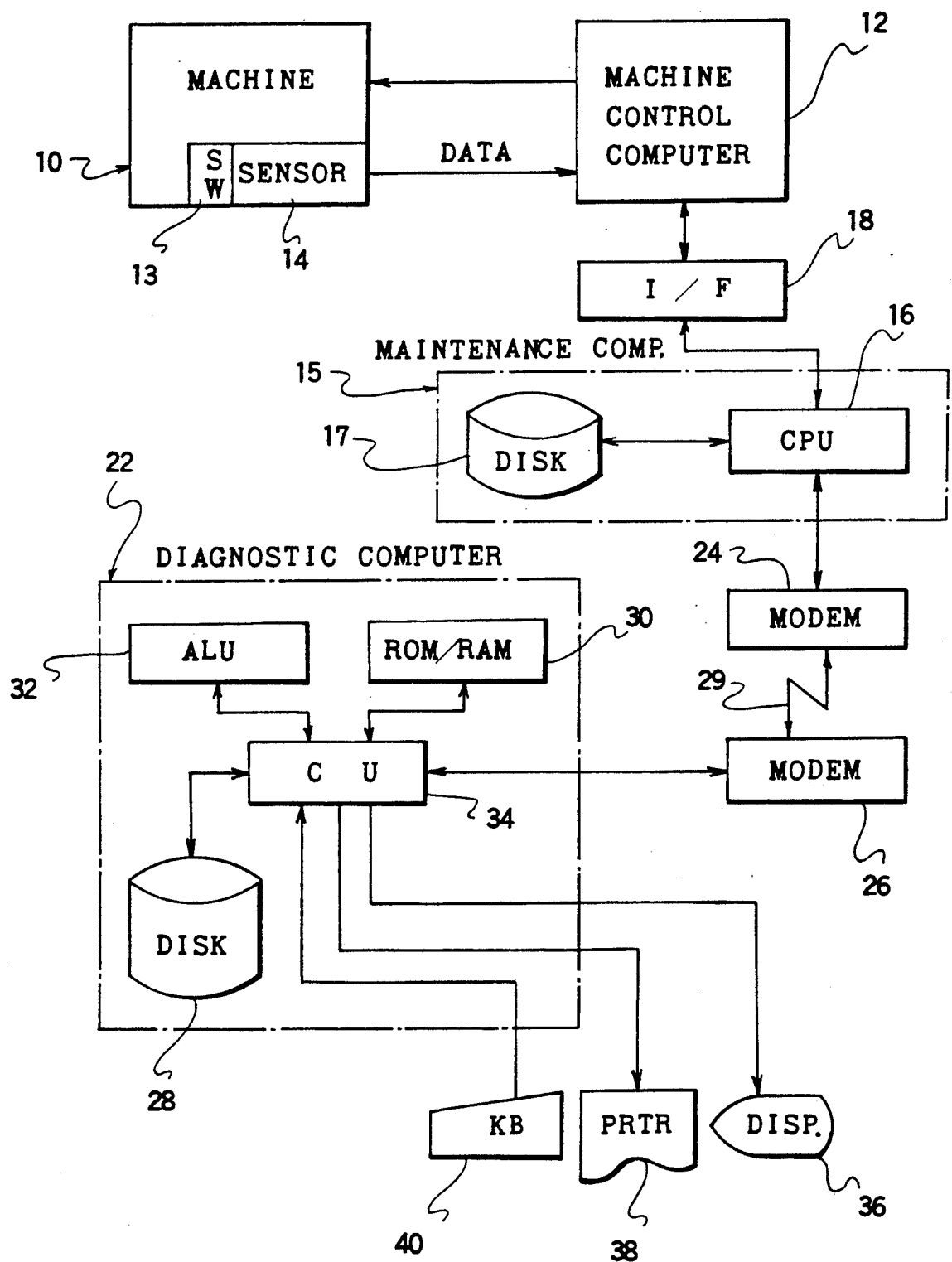
FIG. 1 shows a block diagram of a remote-type diagnostic system of the present invention.

A preferred embodiment of the present invention will now be described in detail with reference to the accompanying drawings. FIG. 1 shows a block diagram of a remote-type diagnostic system of the present invention. In FIG. 1 numeral 10 is a machine, which repeats the same operations, such as an automatic packing machine, etc. A machine control computer 12 controls the operation of the machine 10.

A sensor 14 is assembled in a circuit of the machine 10. The sensor 14 senses an output pulse of the circuit relative to a reference pulse. Data sensed by the sensor 14 are, for example, time between inputting the reference pulse and turning on a prescribed limit switch 13 and time of turning off the limit switch 13. The data sensed by the sensor 14 are always sent to the machine control computer 12. It is noted that the number of data sensed is not limited but the case of two (2) data is explained in this embodiment.

A maintenance computer 15 is provided on the machine 10 side of this remote system. The maintenance computer 15 is connected to the machine control computer 12 via an interface 18. The real time data which are sent to the machine control computer 12 by the sensor 14 are also sent to the C.P.U. (Central Processing Unit) 16 of the maintenance computer 15 from the machine control computer 12. The maintenance computer 15 has a memory unit 17 having a magnetic disk. The real time data from the machine control computer 12 are continuously written in the memory unit 17.

A diagnostic computer 22 is the central element of this system. The diagnostic computer 22 is installed in a centralized processing facility, e.g. a computer center, which is apart from machine-users. The diagnostic computer 22 is connected to many users' maintenance computers 15 by modems 24 and 26 and data communication lines 29. The diagnostic computer 22 can execute batch processing and T.S.S. (Time Sharing System), real time processing.

A memory unit 28 is a magnetic disk having a large memory capacity as first and second memories. The data of output pattern of the real output pulse, which are sensed by the sensor 14 and which are sent by the maintenance computer 15, and the data of output pattern of the ideal output pulse, which are standard output pattern of the circuit to which the sensor 14 is assembled in normal operation of the machine 10 are stored in memory unit 28. Also stored in memory unit 28 are data for diagnoses including probability of occurrence of trouble for the machine 10, places of occurrence of trouble, parts for exchange, etc., which can be obtained from the difference of items from comparing the output pattern of real output pulse with the output pattern of ideal output pulse.

An inner memory 30 of the diagnostic computer 22 consists of a R.O.M. (Read Only Memory) and a R.A.M. (Random Access Memory). A diagnostic data analyzing program for an expert system is stored in the R.0.M. or is loaded in the R.A.M. Further, the R.A.M. is used for counting the number of reading data.

A.L.U. (Arithmetic Logical Unit) 32 in the C.P.U. of the diagnostic computer 22 compares the data of the output pattern of the real output pulse stored in the memory unit 28 with the data of the output pattern of the ideal output pulse stored in the memory unit 28 for each item as compare means.

C.U. (Control Unit) 34 in the C.P.U. of the diagnostic computer 22 diagnoses the interrelationship among the items based on the result of comparison by the A.L.U. 32 according to the analyzing program. The C.U. 34 outputs the interrelationship among the items as a graph by output means such as a display unit 36, a printer 38, etc. Further, the C.U. 34 can foresee the probability of occurrence of trouble, etc. by considering the interrelationship among the items and data for diagnoses in the memory unit 28. The probability, etc. can be also shown on the display unit 36 and printed by the printer 38. Commands and data can be inputted to the C.U. 34 by a keyboard 40.

Figure 2:
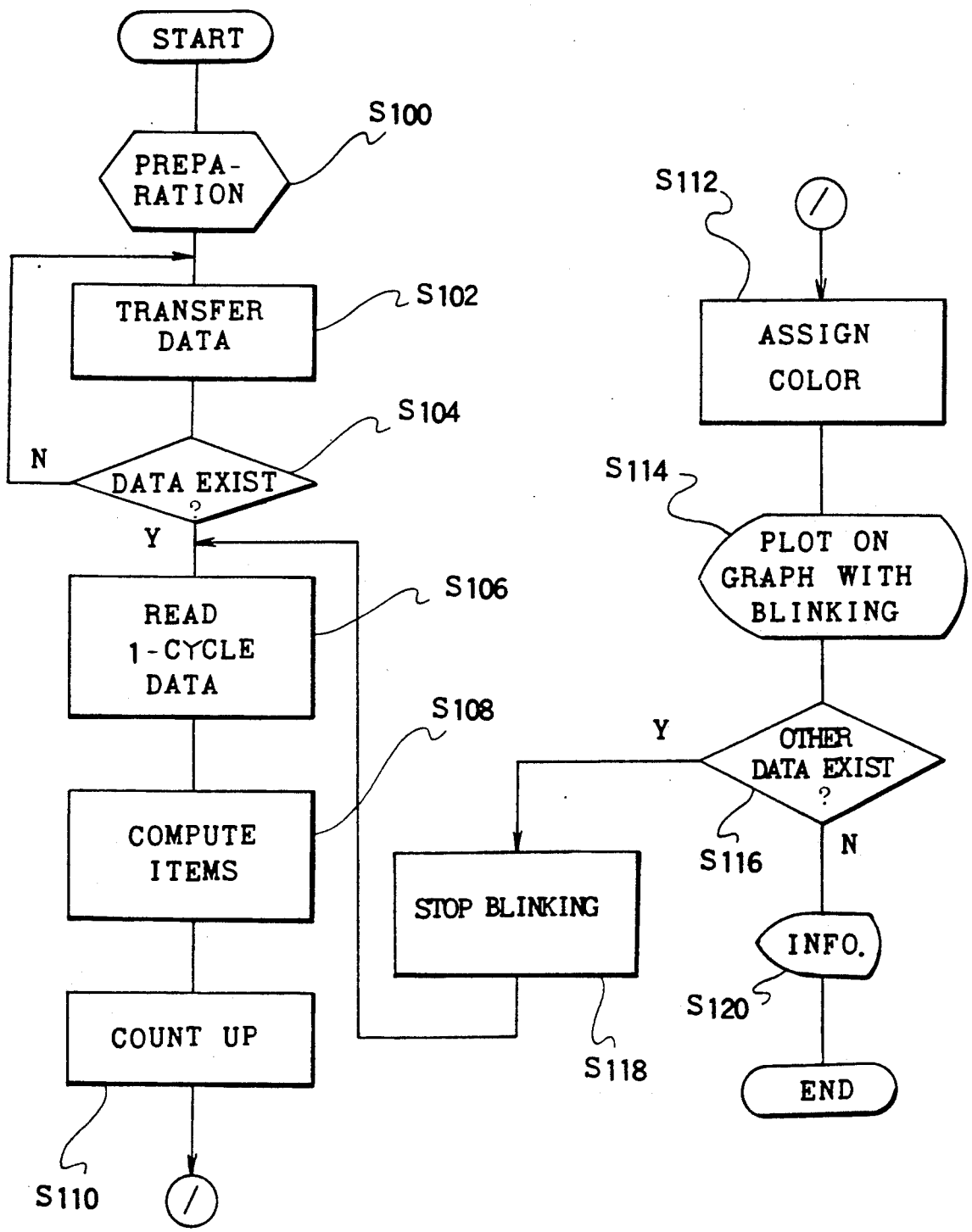
FIG. 2 shows a basic flow chart of the operation of the diagnostic system of FIG. 1.

Next, the function of this system will be explained with reference to a flow chart of FIG. 2. Note that the batch processing system will be explained as an example but T.S.S. real time processing can also be executed as described above.

The data of the output pattern of the real output pulse is continuously sensed and sent to the machine control computer 12 under the control of the machine control computer 12 while the machine 10 is in operation. The data are also sent to the maintenance computer 15 from the machine control computer 12 and the data are written on the memory unit 17 of the maintenance computer 15. Note that the data of the output pattern of the real output pulse may be simultaneously sent to the machine control computer 12 and the maintenance computer 15 from the sensor 14.

In the nighttime during which operation of the machine 10 is stopped, the data of the output pattern of the output pulse are batch-processed.

When command of starting batch processing is inputted to the diagnostic computer 22, the C.U. 34 clears R.A.M. of the inner memory 30 and so on for preparation (step 100), and orders the maintenance computer 15 to transfer the data to the diagnostic computer 22.

The data of the output pattern of the output pulse stored in the memory unit 17 of the maintenance computer 15 are transferred to the diagnostic computer 22 via the data communication lines 29 under the control of the C.U. 34 of the diagnostic computer 22 (step 102). The data transferred are written on the memory unit 28 when all of the data are transferred and written, the C.U. 34 confirms if there are any data not transferred in the memory unit 17 via the data communication lines 29 (step 104). At step 104, if there are data not transferred in the memory unit 17, the C.U. 34 returns back to step 102 to order the maintenance computer 15 to send the data left to the diagnostic computer 22.

If all data are transferred in the memory unit 17 at step 104, the C.U. 34 sends one cycle data of the output pattern of the real output pulse and one cycle data of the output pattern of the ideal output pulse to the A.L.U. 32 so as to compare each one cycle data of the output pattern of the real output pulse of the machine 10 with the ideal one cycle data of the output pattern stored in the memory unit 28 (step 106). The data of the output pattern of the real output pulse and the data of the ideal output pattern, etc. are shown as a graph in FIG. 3.

Figure 3:
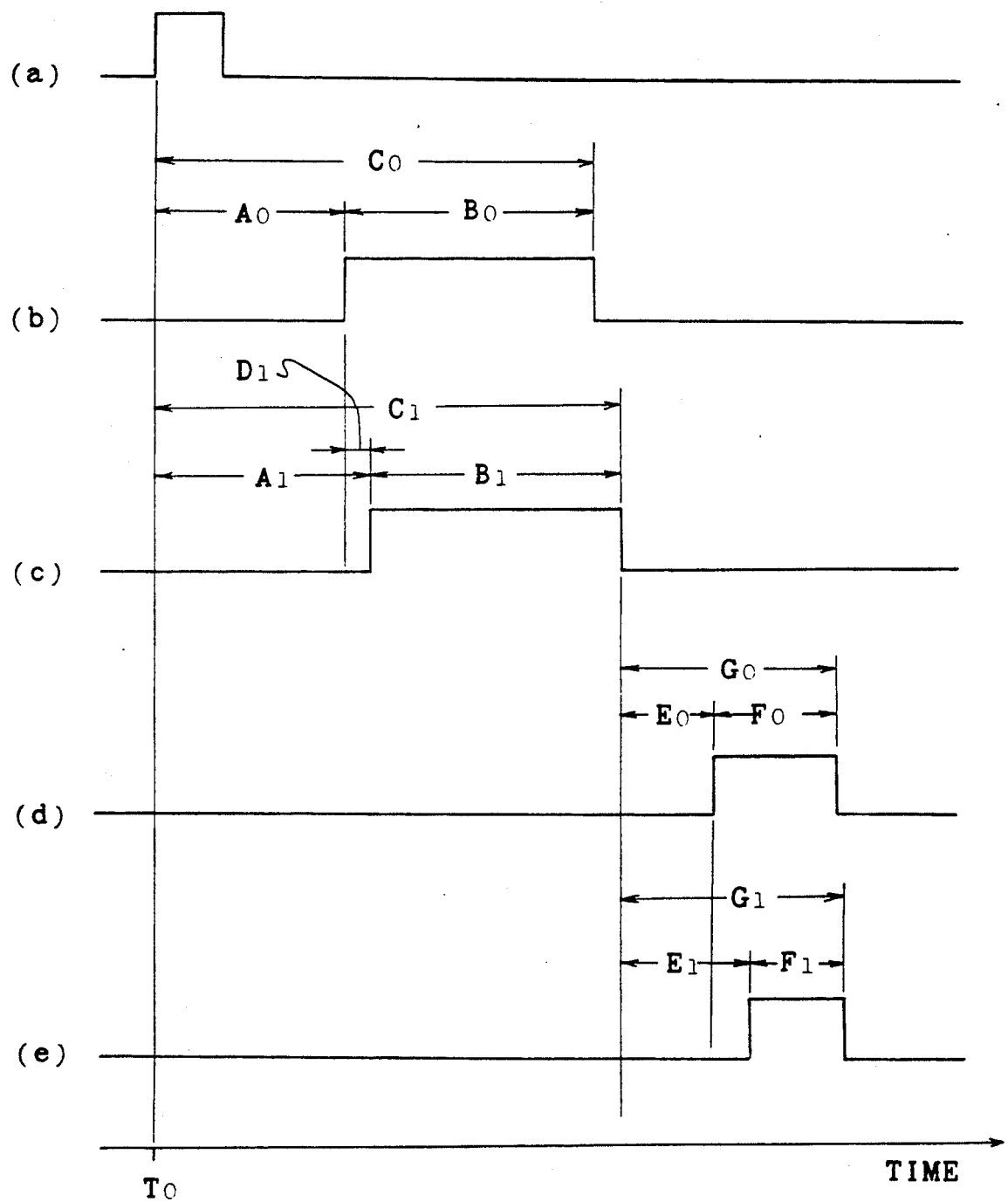
FIGS. 3($a$)-3($c$) show a timing chart of patterns of output pulse.

FIG. 3($a$) shows a reference pulse, which indicates a basic timing of turning on the limit switch 13, and FIG. 3($b$) shows the output pattern of the ideal output pulse with turning on the limit switch 13 at ideal timing. Namely, the ideal output pattern is that the limit switch 13 turns on time $A_o$ after the rising edge of the reference pulse (time point $T_0$) and the limit switch 13 continues to turn on for time $B_0$ (or time $C_0-A_0$). In this case, the ideal value of the item "starting time" is time $A_0$; the ideal value of the item "driving time" is time $B_1$ (or time FIG. 3($c$) shows the output pattern of the real output pulse which appears according to the real operation of the limit switch 13. Namely, the limit switch 13 practically turns on time $A_1$ after the time point $t_0$ and the limit switch 13 continues to turn on for time $B_1$ (or time $C_1-A_1$). In this case, the real value of the item "starting time" is time $A_1$; the real value of the item "driving time" is time $B_1$ (or time $C_1-A_1$.)

The A.L.U. 32 compares the real values with the ideal values for each item. Namely, the A.L.U. 32 calculates "$A_1-A_0$" for the item "starting time", and calculates "$B_1-B_0$" or ("$C_1-A_1)-(C_0-A_0$)" for the item "driving time" (step 108).

After calculation, the C.U. 34 counts up. Namely, a value in an area of the R.A.M. of the inner memory 30, which is assigned as a counter, is incremented by one (step 110). The counter counts the number of comparing values for each item by the A.L.U. 32 so as to define color of dots plotted on the display unit 36. In this embodiment, the color of dots is changed when the counter counts every one hundred (e.g. 1-100: white, 101-200: blue, 201-300: red, . . . ). The order of changing color is defined in the program stored in the R.O.M. of the inner memory 30 beforehand, so that the C.U. 34 defined colors according to the program (step 112).

The remainder, the difference or the result of the comparing for each item is sent to the C.U. 34. The C.U. 34 processes the remainder of both items to show as a graph the interrelationship of the items on the display unit 30 or to print the graph on a paper by the printer 38. The example of the picture of the display unit 36 is shown in FIG. 4.

Figure 4:
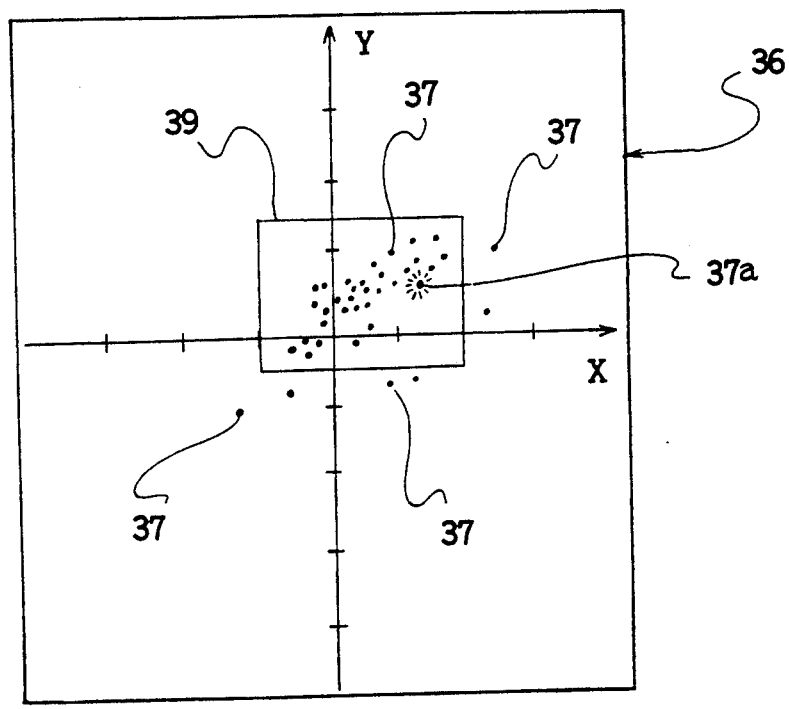
FIG. 4 shows an explanation view of an example of a graph shown by output means.

In FIG. 4, an X-axis indicates the remainder of the item "starting time"; a Y-axis indicates the remainder of the item "driving time". Namely, the origin of the X- and Y- axes is the ideal output timing. Practically, the output pattern of the real output pulse deviates, for example, as shown in FIG. 3($b$) and ($c$): there is time lag between time $A_0$ and $A_1$ and no time lag between $B_0$ and time $B_1$. In this case, the C.U. 34 plots a dot 37$a$ on the coordinates ($A_1-A_0$, 0) or (D:, 0) in the picture of the display unit 36 in assigned color (step 114). There has been a frame 39, which shows allowable range of the deviation, in the coordinates. The dot 37$a$ is plotted with blinking on the picture so as to indicate the plotting position of the latest data. Note that the color of the dot may be defined by unit time length, e.g. every one (1) hour, besides counting the number of comparing the values for each item.

Successively, the C.U. 34 checks if there are other data left in the memory unit 28 (step 116). If there are other data left there, the C.U. 34 stops blinking and lights the dot 37a continuously (step 118), and returns to step 116.

The above stated operation is repeated for every operational cycle of the machine 10 (or for every prescribed time length) so as to plot dots 37 . . . on the display unit 36 until the C.U. 34 judges that there are no data left in the memory unit 28 at step 116.

Dots 37 . . . are shown in FIG. 4. Color of the dots 37 . . . is changed according to time passed, so that the operational tendency of the limit switch 13 can be known by the changing colors. The latest condition can also be easily known because the latest data is indicated by the blinking dot 37a. Therefore, the operational tendency, the probability of occurrence of trouble in the machine 10, etc. can be easily foreseen.

With showing the interrelationship between the two items of "starting time" and "driving time" as the two dimensional graph, foreseeing the probability of occurrence of trouble or clearing up causes of the trouble can be executed at once. Note that the frame 39 showing the allowable range has been inputted to the C.U. 34 to show on the display unit 36 through the keyboard 40 beforehand. If plotted dots 37 . . . are in the frame 39, it says that the operational timing of the limit switch 13 does not coincide with the ideal timing but the difference is allowable.

Further, in the system of the present embodiment, maintenance information such as the occurrence of trouble, parts having trouble, etc. can be gotten according to the program stored by the C.U. 34, and the information can be shown by the display unit 36 or printed by the printer 38. The operator is informed of the information outputted and he or she can adjust the machine 10 or exchange parts before trouble occurs.

In the above described embodiment, the reference pulse is an independent pulse as shown in FIG. 3(a). The reference pulse need not be an independent pulse. For example, rising (or trailing) edge of a pulse of showing the timing of turning on the limit switch 13 (see FIG. 3(c)) can be used as a standard time point instead of the rising edge of the reference pulse of FIG. 3(a). In this case, if the output pattern of the ideal output pulse is shown in FIG. 3(d); the output pattern of the real output pulse is shown in FIG. 3(e), the ideal value of the item "starting time" is time $E_0$; the ideal value of the item "driving time" is time $F_0$ (or time $G_0-E_0$), and the real value of the item "starting time" is time $E_1$; the real value of the item "driving time" is $F_1$ ( or time $G_1-E_1$). Therefore, a dot is plotted at the point $(E_1-E_0, F_1-F_0)$ on the X-Y coordinates of the display unit 36 so as to show the interrelationship between the two items.

In the present embodiment, the number or items has been two and the interrelationship of them is shown by a two dimensional graph. However, in the case of three items, the interrelationship can be shown by a three dimensional stereo graph. Further, in the case of four items or more, the interrelationship can be shown by a plurality of graphs.

A preferred embodiment of the present invention has been described in detail but the present invention is not limited to the above described embodiment, and many modifications can be allowed without deviating from the spirit of the invention.

What is claimed is:

1. A diagnostic system comprising:
    a first memory storing an output pattern of an ideal output pulse with respect to a reference pulse;
    A second memory storing an output pattern of a real output pulse with respect to the reference pulse;
    compare means for comparing the output patterns stored in said first memory and said second memory so as to get a difference between the output patterns by comparison between the two output patterns; and
    control means for showing the difference between the output patterns as a graph of an interrelationship between the output patterns on output means.

2. The diagnostic system according to claim 1, wherein the difference between the output patterns comprises two items, a first item is a different between a first time from a rising edge of the ideal output pulse, and a second time from the rising edge of the reference pulse to a rising edge of the real output pulse, and a second item is a difference between pulse width of the ideal output pulse and pulse width of the real output pulse, and
    the graph shown by the control means on said output means is a two dimensional graph showing an interrelationship between the first item and the second item.

3. The diagnostic system according to claim 1, wherein the difference between the output patterns comprises two items, a first item is a difference between a first time from a rising edge of the reference pulse to a rising edge of the ideal output pulse and a second time from the rising edge of the reference pulse to a rising edge of the real output pulse, and a second item is a difference between a third time from the rising edge of the reference pulse to a trailing edge of the ideal output pulse and a fourth time from the rising edge of the reference pulse to a trailing edge of the real output pulse.

4. The diagnostic system according to claim 1, wherein said control means is capable of showing a specific area in the graph shown by said output means.

5. The diagnostic system according to claim 1, wherein the graph of the interrelationship between the output patterns is shown by plotting dots, and said control means defines color of dots in every unit time.

6. The diagnostic system according to claim 5, wherein said control means blinks display of a latest dot plotted.

7. The diagnositc system according to claim 1, wherein the graph of the interrelationship between output patterns is shown by plotting dots, and said control means defines color of dots for a prescribed number of the real output pulse.

8. The diagnostic system according to claim 1, wherein said control means blinks display of a latest dot plotted.

9. The diagnostic system according to claim 1, further comprising connect means for connecting said control means to an outside system which receives the output pattern of the real output pulse.

10. The diagnostic system according to claim 9, wherein said connect means connects said control means to said outside system via a data communication line.

* * * * *